(No Model.)
R. J. MOXLEY.
SAW FRAME.
No. 518,420.  Patented Apr. 17, 1894.
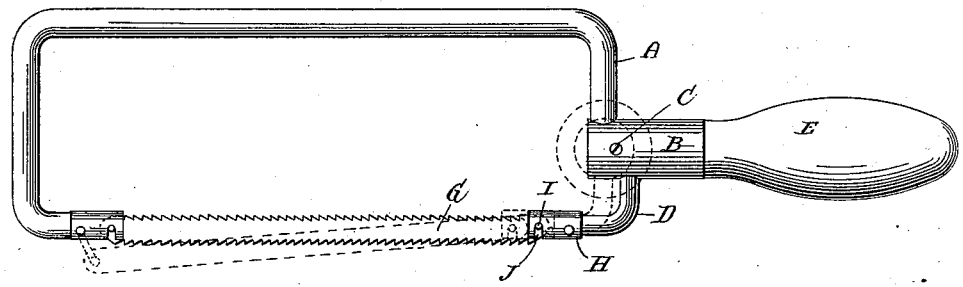
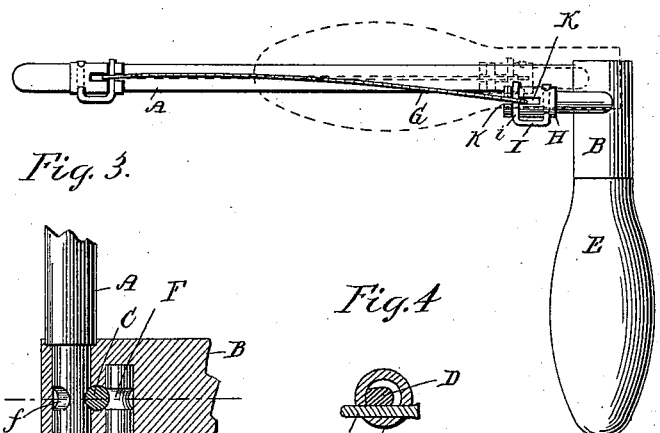
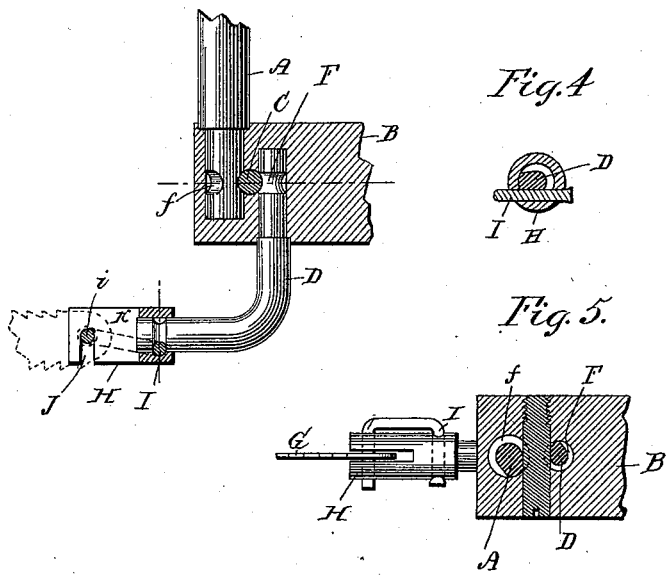
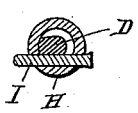
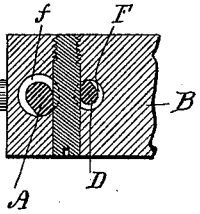
Witnesses:
Wm. J. Rathgeber
John A. Rathgeber
Inventor
Richard J. Moxley

UNITED STATES PATENT OFFICE.

RICHARD J. MOXLEY, OF NEW HAVEN, CONNECTICUT.

SAW-FRAME.

SPECIFICATION forming part of Letters Patent No. 518,420, dated April 17, 1894.

Application filed May 29, 1893. Serial No. 475,993. (No model.)

*To all whom it may concern:*

Be it known that I, RICHARD J. MOXLEY, a citizen of the United States, and a resident of New Haven, county of New Haven, State of Connecticut, have invented new and useful Improvements in Saw-Frames, of which the following is a specification.

The object of my invention is to provide an improved saw frame to which the saw blade may be quickly and easily affixed and the necessary tension be given to the blade by a simple reversal of the handle.

The improvement consists in the novel construction of the parts and in the fact that the saw blade is held in place by U shaped staples upon which the blade is placed while in full view and then swung into place thus obviating the necessity of securing alignment of holes before inserting a pin as customary in saw frames, also in the fact that the blade may be given a half turn without removing it from the frame thus adapting it especially to the use of saws having teeth upon both edges.

Figure 1 gives a front view of the saw frame with the saw blade tightened in place as when in use also when relieved from the tension with one end of the blade on the U staple ready to swing into place. Fig. 2 is a plan view showing the position of the handle when it is desirable to insert or remove the saw blade. Fig. 3 is a sectional view revealing the manner in which the screw C holds the bow A and the stud D in place while permitting them to turn, likewise how the sleeve H is held on the stud D by one end of the U staple I being permitted to turn. Fig. 4 shows how the sleeve H is allowed to make a half turn while held on the stud D by the staple I. Fig. 5 shows how the screw C while holding the bow A and the stud D in the socket B and permits them to turn therein stops the progress of the handle E when it has reached a point parallel with the bow A as when in use.

The handle end of a bow A enters into a socket B and is held therein by a screw C which permits giving it a half turn. A stud D also enters the socket B opposite the bow A and nearer a handle E being held in place by the screw C which conjointly with a groove F f permits a half turn being given, thus by swinging the handle E a cam motion is obtained tightening a saw blade G when the handle E is turned parallel with the bow A as when in use. The other end of the stud D enters into a sleeve H and is held there by one end of a staple I i which in conjunction with a groove J allows said sleeve to make a half turn on said stud. The other end of the staple I i when swung into a slot K supplies the means of attaching the saw blade G to the frame.

I claim—

1. The combination in a saw frame of the socket B having a receiving hole on the upper side for the bow A another hole on the under side nearer the handle E to receive the stud D also a hole at right angles to and between aforesaid holes into which the screw C enters passing simultaneously through peripheral grooves in said bow and stud substantially as described and for the purpose specified.

2. In a saw frame the U shaped staple I in combination with the sleeve H having a slot K one end of said staple passing jointly through the stud D and the sleeve H and the other end swinging into said slot K substantially as set forth and for the purpose specified.

RICHARD J. MOXLEY.

Witnesses:
   ISAAC WOLFE,
   WM. J. RATHGEBER.